United States Patent [19]

Barrett et al.

[11] Patent Number: 5,834,686
[45] Date of Patent: Nov. 10, 1998

[54] INSULATED ELECTRICAL EQUIPMENT

[75] Inventors: Donald Christopher Barrett; Michael Robert Cook, both of Swindon, England; Matthew Spalding, Newark, Del.

[73] Assignee: Raychem Limited, Swindon, United Kingdom

[21] Appl. No.: 836,950

[22] PCT Filed: Nov. 14, 1995

[86] PCT No.: PCT/GB95/02663

§ 371 Date: May 22, 1997

§ 102(e) Date: May 22, 1997

[87] PCT Pub. No.: WO96/16416

PCT Pub. Date: May 30, 1996

[30] Foreign Application Priority Data

Nov. 24, 1994 [GB] United Kingdom ............... 9423763

[51] Int. Cl.$^6$ ................................................. H01B 17/00
[52] U.S. Cl. ................ 174/5 R; 174/138 F; 52/101; 47/23
[58] Field of Search ............... 174/3, 5 R, 40 R, 174/138 R, 138 F, 144, 135, 140 R, 141 R, 139, 211, 140 CR, 209; 52/101; 47/23, 24; 361/232

[56] References Cited

U.S. PATENT DOCUMENTS

| | | |
|---|---|---|
| 1,766,636 | 6/1930 | Holzel . |
| 2,099,540 | 11/1937 | Smith ................................ 173/28 |
| 2,234,391 | 3/1941 | Taylor . |
| 2,617,378 | 11/1952 | Osol ................................... 114/221 |
| 2,999,479 | 9/1961 | Carder ................................. 119/1 |
| 3,005,436 | 10/1961 | Caldwell ............................. 114/221 |
| 3,016,034 | 1/1962 | Raistakka ........................... 114/221 |
| 3,056,376 | 10/1962 | Bender ................................ 116/23 |
| 4,053,707 | 10/1977 | Ely et al. ............................ 174/209 |
| 4,201,883 | 5/1980 | Sheperd ............................. 174/139 |
| 4,243,628 | 1/1981 | Herold ................................ 264/275 |
| 4,467,387 | 8/1984 | Bergh et al. ....................... 361/123 |
| 4,637,164 | 1/1987 | Brown ................................. 47/24 |
| 4,731,507 | 3/1988 | Torimto et al. .................... 174/139 |
| 5,023,406 | 6/1991 | Thornley ............................ 174/209 |
| 5,293,721 | 3/1994 | Richard et al. .................... 52/101 |
| 5,293,835 | 3/1994 | Shagoury ........................... 119/57.9 |
| 5,347,769 | 9/1994 | Dinsmore ............................ 52/101 |
| 5,446,242 | 8/1995 | Barrett ................................ 174/140 R |

FOREIGN PATENT DOCUMENTS

| | | | |
|---|---|---|---|
| 0 328 365 A2 | 8/1989 | European Pat. Off. | H01B 17/42 |
| 2 307 352 | 11/1976 | France | H01B 17/42 |
| 3528771 | 2/1987 | Germany . | |
| 1 542 845 | 3/1979 | United Kingdom | H01B 17/42 |
| WO 95/10844 | 4/1995 | WIPO | H01B 17/42 |
| WO 96/35217 | 11/1996 | WIPO | H01B 17/00 |

OTHER PUBLICATIONS

Derwent Abstract WPI Acc. No. 93–026781 (1993) and JAPIO abstract No. 04021243 (abstracts of Chubu Elec. & Furukawa Elec., JP 05–012943 (1993).

Patent Abstract of Japan, vol. 13, No. 109 (E–727), 19 Mar. 1989 (abstract of JP 63–281323.

IEEE Standard No. 1264–1993, "IEEE Guide for Animal deterrents for Electric Power Supply Substations", Jan. 3, 1996.

*Primary Examiner*—Bot L. Ledynh
*Assistant Examiner*—Dhiru R. Patel
*Attorney, Agent, or Firm*—Yaun Chao; Herbert G. Burkard

[57] ABSTRACT

A generally disc-shaped polymeric insulating article (14) is in two parts to fit around the core (4) of an insulator (2). A first part (22) of the article (14) is substantially C-shaped to fit around the insulator core (4), and the second part comprises an insert (30) that slidably engages the first part (22) so as to secure the article in place. The article (14) projects a substantial distance radially from the insulator (2) to prevent animals and the like, bridging the length of, and thus electrically short circuiting, the insulator (2).

12 Claims, 2 Drawing Sheets

INSULATED ELECTRICAL EQUIPMENT

BACKGROUND OF THE INVENTION

1. Field of the Invention

This invention relates to an insulating article for protecting electrical equipment and to such equipment having the article mounted thereon.

2. Description of Related Art

Electrical equipment, such as power transmission lines, insulators, surge arresters, switchgear and transformers, operating at voltages in excess of 1 kV and particularly in excess of 10 kV (such voltages hereinafter being referred to as 'high voltage'), often have parts thereof or parts associated therewith that are not insulated from the surrounding air. Thus, an exposed portion of such equipment can be at high voltage and be longitudinally separated from another portion at low voltage, for example at earth potential. The exposed high voltage portion may be physically supported by an insulator, for example when an overhead power line is mounted on an insulator that spaces it from a supporting tower that is itself at earth potential, or for example when a high voltage cable is terminated at a bushing or switchgear whose metal housing is at earth potential. In such instances outdoors, animals, birds and reptiles for example, and particularly the larger wildlife such as squirrels and birds with large wingspans, may be big enough to form a direct bridge, ie. an electrical short circuit, between the high voltage equipment and earth potential, with serious, usually fatal, consequences for themselves and often with serious consequences for the electrical equipment and the supply of electrical power—usually at least a fuse is interrupted or a circuit breaker triggered such that the power supply is interrupted.

One solution to this problem is to insulate the exposed parts of the high voltage equipment, at least in regions where a short circuit to earth is more likely to occur, for example unintentionally by wildlife, and products such as RAYSULATE insulation tapes and pre-shaped components are available from Raychem for this purpose. A further solution is to mount uninsulated components sufficiently far apart from each other. In some instances, however, these solutions may be impracticable and/or expensive.

Another solution is to mount an insulating guard on the apparatus so as physically to increase the distance between the two portions at such significantly different, ie. harmful, electrical potentials such that it is impossible, or at least more unlikely, that the wildlife will be able to form a direct bridge therebetween. A typical insulator for outdoor use, for example, may be made of porcelain or polymeric material and is usually provided with a plurality of rain sheds or skirts, that extend circumferentially around a central cylindrical core of the insulator and that are spaced apart along its length. A protective guard in respect of avoiding short-circuiting such an insulator by wildlife is known, the guard comprising two semi-circular discs that are brought together from each side of the insulator between two adjacent sheds. The semi-circular discs partially overlap and are interlocked, for example by means of projections on a face of one disc that engage apertures in the other disc. The diameter of the guard is typically about three times that of the sheds, and when in place provides an effective obstacle to wildlife extending themselves along the length of the shedded insulator from earth to high voltage. However, a guard of this configuration is not very convenient to position on the insulator, which may be difficult to access, as by being mounted on top of a pole of about 4 m height for example. It is necessary to support the two halves separately, bring them together in overlapping relationship, and then to operate the interlocking mechanism. This usually cannot be done from a distance, from ground level for example, and the power supply to the electrical equipment, to the power line supported on the insulator for example, may have to be interrupted in order properly to fit the guard.

SUMMARY OF THE INVENTION

It is one object of the present invention to provide an article that can more conveniently be mounted on electrical equipment so as electrically to protect the equipment, and thus associated electrical components, from being short-circuited, for example due to the presence of wildlife.

Thus, in accordance with one aspect of the present invention, there is provided a substantially planar electrically insulating article for protecting electrical equipment of generally elongate configuration and that, in operation, has two longitudinally spaced apart portions at significantly different electrical potentials, the article comprising:

a first part that is substantially planar and of a generally C-shape, the first part having an aperture located substantially centrally thereof for receiving the electrical equipment therethrough, which aperture is elongated so as to form a slot that extends, substantially unidirectionally, to the perimeter, for example circumference, of the first part; and a second part that forms an insert arranged to engage with the slot of the first part so as to complete the perimeter of the article and so as, in operation, to mount the article securely around the electrical equipment.

Advantageously, the first part is of substantially disc configuration, having a substantially circular outer perimeter.

Thus it is a single part only, the first part, of the article of the invention that provides the major surface area forming an obstacle to a direct bridge over a relatively short length between the two portions of the equipment at different potentials. The insert provides a minor surface area and serves to lock the complete article on to the electrical equipment. Such a construction allows the article to be fitted by one person, from a distance, using a gripping tool on an extension arm if necessary.

The direct distance between the two portions at significantly different electrical potentials is the shortest distance between those portions that could be bridged by wildlife such as squirrels or large birds, and is typically about 30 to 35 cm minimum. Usually one of the portions is at a high voltage, for example up to about 15 kV, and the other portion is at earth potential. However, similar problems with animals and the like can give rise to formation of a bridge between two phases of a 3-phase power supply.

The potentials of the two portions are considered to be significantly different if an animal or the like spanning the portions could cause damage to the equipment and/or harm to itself. The area covered by the first part is not critical, but advantageously it is as large as possible compatible with the size of the insert being handled conveniently, and may comprises up to 75% or more of the total surface area of the article.

Advantageously the slot is defined by parallel edges that extend generally radially from the central aperture to the circumference of the first part, and in co-operation therewith the insert is of generally rectangular, or at least rectilinear shape. At its innermost end, the slot terminates at the central aperture that is dimensioned, usually of a diameter, so as just to pass over the electrical equipment, for example the central core of an insulator.

One of the two parts of the article may be provided with a groove arrangement, preferably as by providing the insert with a groove along each of its parallel edges, to receive the other part as a sliding fit therein.

In one embodiment, the sliding interengagement may be by means of a ratchet mechanism, such that the insert can be progressively and irreversibly urged into complete engagement with the major part forming the guard for the electrical equipment.

In another embodiment, the two parts of the insulating guard article may overlap, for example at edges thereof and one or more small, eg. circular, holes in one part may be caused to align with respective ones of larger holes, or elongate slots, of the other part. Then, the insert may be urged into complete engagement with the major part, for example by a tongue-and-groove sliding action, by means of strings or wires, or the like, threaded therethrough.

In each of these embodiments, the positioning of the two parts and the relative movement therebetween can conveniently be effected by an operator at ground level, even when the article needs to be located on a support pole a few metres above the ground—it will be appreciated that insulating rod-like equipment may be needed. Furthermore, the fitment of the article can usually be effected without the need to interrupt the supply of electric power to the electrical equipment.

Usually, the electrical equipment on which the article of the invention is mounted is of generally circular cross-section, and its diameter may be within a predetermined range depending, for example, on its voltage rating. It is advantageous therefore if a single insulating article can be provided that has a range-taking ability so that it can be used with differently-sized pieces of electrical equipment. The sliding interengagement discussed above will generally allow this. Range-taking, whilst maintaining the ability to achieve secure retention of the article on the equipment, can be enhanced if the central aperture fully defined by the two parts of the article is delineated by one, or preferably a pair, of substantially U- or V- shaped surfaces - for example one such surface being provided by each of the parts of the article. The extent of interengagement of the two parts, such as the extent to which the insert is able to progress along the elongated portion of the aperture, will then vary depending on the diameter, or other transverse dimension, of the electrical equipment.

Advantageously the insulating article, and preferably both parts thereof, is formed from polymeric material such as polyethylene, EPDM or silicone, which preferably is also substantially electrically non-tracking. ASTM D2303 sets out methods for evaluating the relative tracking resistance of insulating solid materials.

The article of the invention, in keeping with the equipment on which it is mounted, will usually be of substantially circular shape. However, it will be appreciated that the object of avoiding formation of a direct bridge over a relatively short path length between two parts of electrical equipment at significantly different electrical potentials, may be achieved by a laterally-extending insulating article of different shape, and references to 'disc shape' should be interpreted accordingly.

In another aspect of the present invention, there is provided electrical equipment having mounted thereon at least one substantially planar electrically insulating article in accordance with the one aspect of the invention as hereinbefore described.

In cases where the equipment is fitted with laterally-extending rain sheds, the insulating article will usually extend laterally a significantly further distance from the core of the equipment. For example, the insulating guard article may be generally circular and have a diameter twice or even three, or more, times that of the rain shed associated with the equipment, and four, five or more times that of a cylindrical core of the equipment—when the equipment comprises a shedded insulator for example.

The apparatus may be orientated substantially vertically, substantially horizontally, or at any other angle.

Advantageously, one or preferably both parts of the article of the invention are apertured over their surface such that any equipment that is mounted beyond, for example above or behind, the article is visible therethrough.

The electrical equipment may comprise, for example, a stand alone insulator, or the insulator may function as an insulating bushing of switchgear or a transformer. The insulating function may also be combined with another function, such as by the equipment comprising a fuse, a circuit breaker or a surge arrester.

BRIEF DESCRIPTION OF THE DRAWINGS

An insulating guard and electrical equipment protecting article, and electrical equipment protected by the article, in accordance with the present invention, will now be described, by way of example, with reference to the accompanying drawing in which.

DESCRIPTION OF THE PREFERRED EMBODIMENTS

Figure 1:
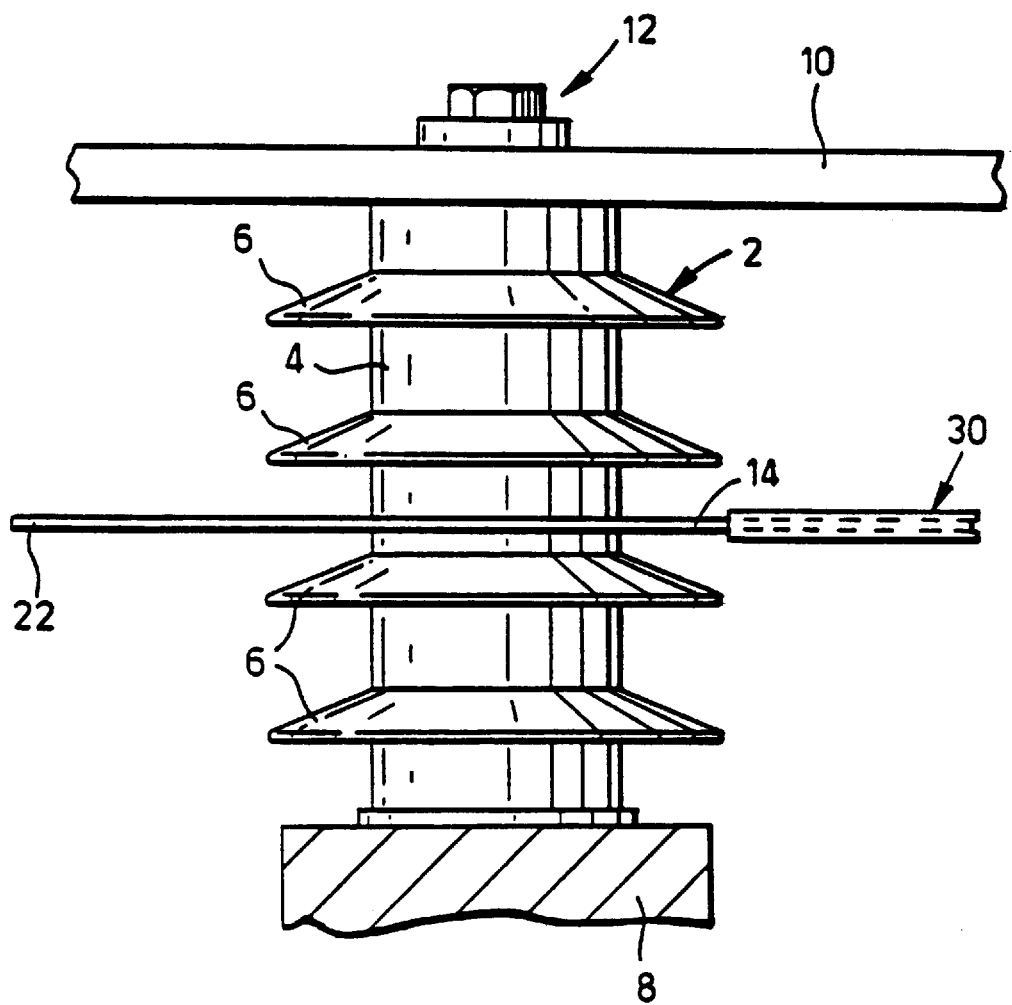
FIG. 1 is a schematic elevation of a high voltage insulator fitted with the insulating article.

Referring to FIG. 1, an elongate high voltage insulator 2 for outdoor use is made of porcelain and comprises a generally cylindrical core 4 of diameter about 11 cms and four longitudinally spaced apart rain sheds 6 of diameter about 20 cms integral therewith. The insulator 2 is mounted vertically on an earthed metal base 8, and supports an uninsulated high voltage conductor 10 by being bolted thereto at 12. The shortest direct distance between the earthed plinth 8 and the conductor 10 at high voltage depends, in practice, on the voltage rating but may be as little as approximately 30 cms, a distance that can be bridged by certain forms of wildlife. To safeguard such wildlife and also the continuity of supply of electrical power along the conductor 10, a generally circular disc-shaped polymeric insulating guard 14 of diameter about 60 cms is mounted on the insulator 2. The guard 14 is fixed to the core 4 of the insulator 2 about halfway along the length of the insulator. With the guard 14 in position on the insulator 2, the direct distance between earth and high voltage along the insulator 2 is significantly increased.

Figure 2:
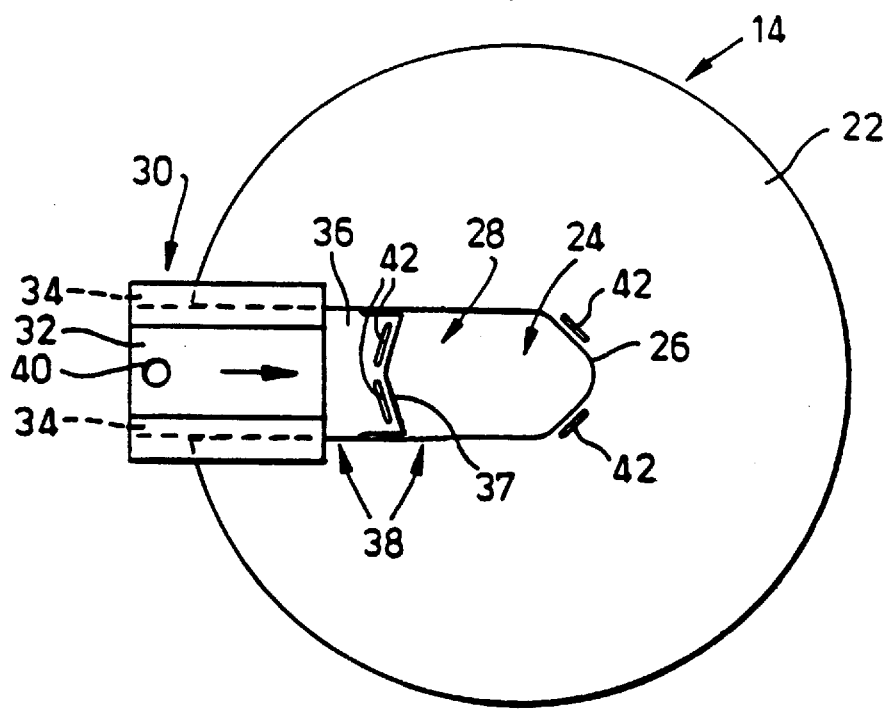
FIG. 2 is a plan view of one embodiment of the article of the invention.

One embodiment of the insulating guard 14 is shown in FIG. 2, and comprises a planar substantially C- shaped disc part 22 of high density polythene containing an anti-tracking additive. The disc 22 has a central aperture 24 defined to one side by a substantially V-shaped surface 26, the aperture 24 to its other side extending as an elongate slot 28 to the circumference of the disc 22. The edges of the slot 28 are parallel to each other.

The slot 28 of the guard disc 22 receives therein a planar polymeric insert 30 that comprises a relatively thick rectangular portion 32 having a groove 34 along each of a pair of parallel edges for receiving respective edges of the slot 28 of the disc 22 as a sliding fit. The insert 30 has a relatively thin projecting portion 36 facing the central aperture 24 having a substantially V-shaped leading edge 37. As the insert 30 moves progressively inwardly along the slot 28, a ratchet mechanism 38 is engaged such that the insert 30 cannot be retracted or otherwise forced back out of the slot. The insert 30 is provided with a hole 40 therethrough adjacent its outer edge.

The insulating guard 14 is mounted on the insulator 2 by firstly sliding the disc 22 into position from one side around the core 4, which may be a tight or a loose fit in the slot 28. The insert 30 is then manoeuvred such that the slot edges are located in its grooves 34. These positionings may be carried out directly by hand, or tools may be employed to grip the parts and to urge them together, for example by inserting a rod through the insert aperture 40 to urge the insert along the slot 28. As the insert 30 is moved towards the insulator core 4, the ratchet mechanism 38 is engaged, and on further movement, the V-shaped surfaces 26 and 37 of the disc 22 and insert 30 respectively abut the insulator core 4. The insert 30 is urged inwardly of the slot 28 until the guard 14 is firmly secured on the insulator 2.

The ratchet mechanism 38 and V-shaped surfaces 26 and 37 allow the guard 14 to adapt and to be secured to a range of insulator core diameters. As shown, however, cut outs 42 are made in the disc 22 and the insert 30 adjacent the V-shaped, insulator-contacting surfaces 26, 37 respectively, so as to provide those surfaces with a certain amount of flexibility for ensuring a tight fit on to the insulator 2.

Figure 3:
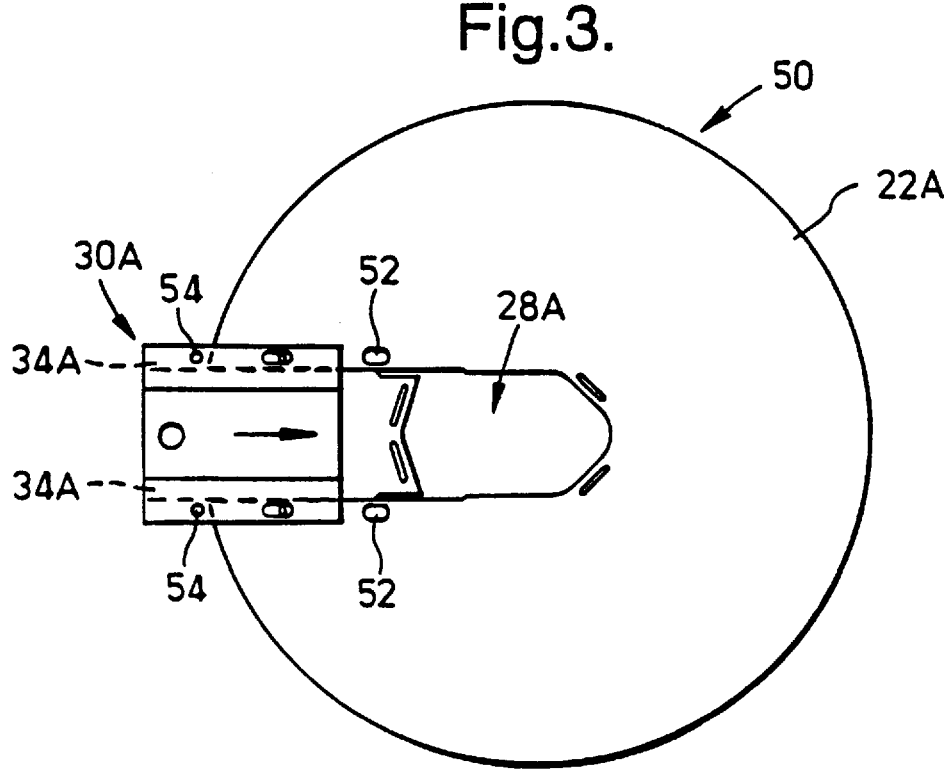
FIG. 3 is a plan view of another embodiment of the article of the invention.

FIG. 3 shows an insulating guard 50 that is similar to the guard 14 described above, but that differs from it in the way the insert engages with, and is urged along, the elongate slot. The postscript A will be added to the reference numbers of FIG. 3 corresponding to the similar or corresponding parts of FIG. 2. Thus, referring to FIG. 3, the insert 30A engages the slot 28A of the disc 22A. In this embodiment, there is no interengaging ratchet mechanism. A row of oval-shaped holes 52 extends along each side of the disc slot 28A, and a row of smaller, circular-shaped holes 54 extends along each side of the insert 30A passing through the grooves 34A and overlying the holes 52. Tie wraps (not shown), or other suitable forms of wire or string etc, can thus be passed from above the guard 50 downwards through a radially outermost hole 54 of the insert 30A and also downwards through the radially innermost hole 52 of the disc 22A, on each side of the insert 30A. Drawing the ends of the wraps together from a location beneath the guard 50 will then urge the guard inwardly along the slot 28A and into engagement with the insulator core 4, as previously, so as securely (when the tie wraps are tied) to mount the guard 50 on the insulator 2.

It will be appreciated that if desired, a guard may employ a combination of the urging and fixing arrangements described.

We claim:

1. A substantially planar electrically insulating article for protecting from being short-circuited electrical equipment that is of generally elongate configuration and that, in operation, has two longitudinally spaced apart portions at significantly different electrical potentials, the article comprising:

a first part that is substantially planar and of generally C-shape, the first part having an aperture located substantially centrally thereof for receiving the electrical equipment therethrough, which aperture is elongated so as to form a slot that extends substantially unidirectionally to the perimeter of the first part; and a second part that forms an insert arranged to engage with the slot of the first part so as to complete the perimeter of the article and so as, in operation, to mount the article securely around the electrical equipment.

2. An article according to claim 1, wherein the slot of the first part is bounded by two edges that are substantially parallel to each other, and wherein the insert is of substantially rectilinear configuration and slidably engages with the slot.

3. An article according to claim 1 or claim 2 wherein one of the parts is provided with a groove arrangement into and along which the other of the parts fits to achieve the securement between them.

4. An article according to claim 1 or claim 2 wherein the two parts interlock with each other by means of a ratchet mechanism.

5. An article according to claim 1 or claim 2 wherein the insert is urged along the slot towards the central aperture of the first part by wire means passing through co-operating holes in overlapping regions of the two parts.

6. An article according to claim 1 or claim 2, wherein at least part of the edges of the first part and the insert facing the central aperture of the first part are substantially U- or V-shaped so as, in operation, to abut the electrical equipment extending therethrough and to accommodate said equipment having a range of cross-sectional dimensions.

7. An article according to claim 1 or claim 2, wherein at least one of the insert and the first part is provided with at least one aperture adjacent the central aperture of the first part such that at least one of the insert and the first part is arranged, in operation, resiliently to engage said electrical equipment when extending through the article.

8. An article according to claim 1 or claim 2 made from electrically insulating and substantially non-tracking polymeric material.

9. Elongate electrical equipment having mounted thereon at least one substantially planar electrically insulating article according to claim 1 or claim 2.

10. Elongate electrical equipment according to claim 9 having a generally cylindrical core that extends through said central aperture of said at least one substantially planar electrically insulating article, with said at least one substantially planar electrically insulating article extending in a plane substantially perpendicular to the axis of the core.

11. Elongate electrical equipment according to claim 9, comprising an elongate core and at least one rain shed extending laterally therefrom, where said at least one insulating article extends laterally from the core by an amount greater than, preferably at least two times greater than, the lateral extension of the rain shed.

12. Elongate electrical equipment according to claim 9, comprising an electrical insulator, a bushing of switchgear or a transformer, or a surge arrester.

* * * * *